United States Patent Office 3,397,200
Patented Aug. 13, 1968

3,397,200
NITROPYRROLYLMETHYLENEAMINOURACILS
George L. Dunn, Willingboro, N.J., assignor to Smith Kline & French Laboratories, Philadelphia, Pa., a corporation of Pennsylvania
No Drawing. Filed Feb. 3, 1965, Ser. No. 430,171
8 Claims. (Cl. 260—240)

ABSTRACT OF THE DISCLOSURE

1 - (5 - nitro - 2 - pyrrolylmethyleneamino) - 5,6 - dihydrouracils, optionally substituted on the pyrrole and/or pyrimidine rings, are prepared by reaction of an appropriately substituted 1-amino-dihydrouracil with a 5-nitropyrrole-2-carboxaldehyde. The products possess antitrichomonal activity.

---

This invention relates to chemical compounds having antimicrobial activity. In particular, the invention relates to 1-(5-nitro-2-pyrrolylmethyleneamino)-5,6-dihydrouracils and derivatives thereof.

The compounds of the invention are represented by the following structural formula:

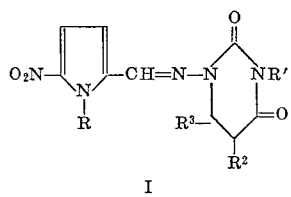

I where R, $R^1$, $R^2$, and $R^3$ are hydrogen or lower alkyl.

When used herein, the term "lower alkyl" is intended to represent an alkyl group of from one to six carbon atoms.

A preferred group of compounds is represented by the following formula:

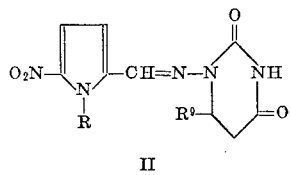

II where R and $R^3$ are hydrogen or lower alkyl.

The compounds of the invention have been found to possess activity against the microorganisms *Trichomonas foetus* and *Trichomonas vaginalis* when evaluated in standard tests.

The preferred species of the invention are 1-(5-nitro-2 - pyrrolylmethyleneamino) - 6 - methyl - 5,6 - dihydrouracil (III) and its N-methyl derivative IV.

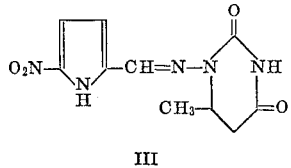

III

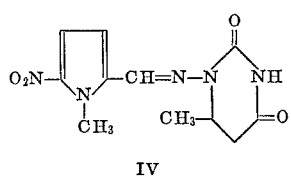

IV

The nitropyrrolylmethyleneaminodihydrouracil compounds of the invention are crystalline solids which are generally prepared by the condensation of an appropriately substituted 1-aminodihydrouracil with 5-nitropyrrole-2-carboxaldehyde or an N-alkyl derivative thereof. The aminouracil is conveniently prepared and kept as its benzylidene Schiff base derivative, and thus the condensation with the pyrrole compound is preceded by hydrolysis of the benzylidene moiety. The benzylidene compound is refluxed in an aqueous mineral acid such as hydrochloric acid, and the by-product benzaldehyde is removed by distillation. An alcoholic solution of 5-nitropyrrole-2-carboxaldehyde or an N-alkyl derivative thereof is then added, resulting in the formation and precipitation of the desired product. The compound is purified by recrystallization from a solvent such as acetonitrile or a solvent pair such as ethanol-dimethylformamide or ethanol-acetic acid.

Certain of the benzylidene Schiff bases are described in J. Med Pharm. Chem 3, 353 (1961). Others are prepared in the following manner. An acrylate ester is condensed with acetone semicarbazone to form a 1-isopropylideneamino-5,6-dihydrouracil. This compound is hydrolyzed by mineral acid to a 1-amino-5,6-dihydrouracil which can be used directly in a reaction with the 5-nitropyrrole-2-carboxaldehyde. More conveniently, it is converted to the benzylidene derivative by reaction with benzaldehyde in dilute hydrochloric acid. Choice of the appropriate acrylate ester determines the presence or absence of an alkyl group at the 5 or 6-position of the uracil ring. A 2-alkylacrylate leads to a 5-alkyluracil, a 3-alkylacrylate leads to a 6-alkyluracil. Among the acrylate starting materials which are suitable are ethyl 2-ethylacrylate, ethyl 2-propylacrylate, ethyl 2-butylacrylate, ethyl 3-methylacrylate, ethyl 2-isopropylacryate, and ethyl 2-pentylacrylate.

The 5-nitropyrrole-2-carboxaldehyde starting material and its N-methyl derivative are described by J. Tirouflet and P. Fournari, Compt, Rend. 246, 2003 (1958) and P. Fournari, Bull. Soc. Chim. France 488 (1963), respectively.

Compounds of Formula I in which R and/or R' are lower alkyl are prepared either by utilizing as a starting material a uracil or pyrrolecarboxaldehyde bearing such a lower alkyl substituent. The latter are known compounds or are prepared by conventional alkylation techniques. Alternatively, a final product of Formula I in which R and R' are hydrogen is treated with an appropriate alkylating agent. Among these reagents are dimethyl sulfate, diethyl sulfate, propyl iodide, and butyl iodide. Alkylation is generally conducted in a basic medium, e.g., dilute aqueous sodium hydroxide solution.

It will be evident that the basic amino compounds of the present invention can be converted into their nontoxic, pharmaceutically acceptable acid addition salts. Such salts include, but are not limited to, the sulfate, hydrochloride, hydrobromide, citrate pamoate, maleate, cyclohexylsulfamate, nitrate, acetate, tartrate, and succinate. Such salts are the full equivalents of the free bases and are included within the scope of this invention. In addition, certain of the compounds of the invention, because of their acidic nature, form alkali metal salts particularly sodium and potassium salts. Such salts are also the full equivalents of the compounds specifically claimed.

The following examples are to be considered as illustrative of the compounds of the invention, but are not to be construed as limitative of the scope thereof.

Example 1.—1 - (1 - methyl - 5-nitro-2-pyrrolylmethyleneamino)-5,6-dihydrouracil A solution of 1-benzylideneamino-5,6-dihydrouracil (J. Med. Pharm. Chem., 3, 353 (1961), 4.34 g., 0.02 mole) in 1:1 aqueous hydrochloric acid (50 ml.) is heated to reflux and the benzaldehyde formed removed by distillation. The hot solution is diluted with water (50 ml.); then a solution of 1-methyl-5-nitro-2-pyrrolecarboxaldehyde (3.1 g., 0.02 mole) in ethanol (50 ml.) is added. The orange precipitate which forms almost immediately is collected after cooling the mixture to 15°. Recrystallization of the crude solid from acetic acid-ethanol gives pale yellow prisms of desired dihydrouracil.

Example 2.—1 - (1 - methyl - 5-nitro-2-pyrrolymethyleneamino-6-methyl-5,6-dihydrouracil The procedure of Example 1 is followed using 4.62 g. (0.02 mole) of 1-benzylideneamino-6-methyl-5,6-dihydrouracil [J. Med. Pharm. Chem., 3, 353 (1961)]. After isolation, there is obtained a crude yellow product, which is recrystallized from ethanol-acetic acid to give the pure yellow product, M.P. 195–197° dec.

Example 3.—1 - (1 - methyl-5-nitro-2-pyrrolylmethyleneamino)-6-ethyl-5,6-dihydrouracil To a solution of sodium (4.6 g., 0.2 mole) in dry ethanol (100 ml.) is added acetone semicarbazone (23 g., 0.2 mole) and ethyl 3-ethylacrylate (25.6 g., 0.2 mole), and the mixture is heated at reflux for 16 hours.

The cooled cloudy solution is poured into a mixture of water (100 ml.) and concentrated hydrochloric acid (20 ml.), benzaldehyde (21.2 g., 0.2 mole) added and the mixture heated to 60° briefly, then cooled to 10° and allowed to stir for one hour. The precipitated solid is collected, then suspended in a stirred cold solution of sodium hydroxide (6.5 g.) in water (150 ml.) After stirring for a half hour, the insoluble benzaldehyde semicarbazone is removed by filtration. The clear filtrate is added slowly to a cold stirred solution of 10% aqueous hydrochloric acid (55 ml.), the precipitated solid collected and recrystallized twice from ethanol to give 1-benzylideneamino-6-ethyl-5,6-dihydrouracil, M.P. 133–135°.

The procedure of Example 1 is then carried out using 4.9 g. (0.02 mole) of this 6-ethyl compound to give the title product.

Example 4.—1 - (1 - methyl-5-nitro-2-pyrrolylmethyleneamino)-6-propyl-5,6-dihydrouracil 1-benzylideneamino - 6 - propyl - 5,6-dihydrouracil is prepared by allowing 28.4 g. (0.2 mole) of ethyl 3-propylacrylate to react with acetone semicarbazone according to the procedure of Example 3. This compound, following isolation and recrystallization, melts at 138–139°.

The procedure of Example 1 is then followed, using 5.2 g. (0.02 mole) of 1-benzylideneamino-6-propyl-5,6-dihydrouracil. The product is recrystallized from acetonitrile.

Example 5.—1 - (1 - methyl-5-nitro-2-pyrrolylmethyleneamino)-6-butyl-5,6-dihydrouracil 1-benzylideneamino-6-butyl-5,6-dihydrouracil is prepared by allowing 31.2 g. (0.2 mole) of ethyl 3-butylacrylate to react with acetone semicarbazone according to the procedure of Example 3. This compound, after recrystallization from ethanol, melts at 140–141°.

The procedure of Example 1 is then followed, using 5.47 g. (0.02 mole) of 1-benzylideneamino-6-butyl-5,6-dihydrouracil. The product is recrystallized from ethanol acetic acid.

Example 6.—1 - (1 - methyl-5-nitro-2-pyrrolylmethyleneamino)-5-methyl-5,6-dihydrouracil The procedure of Example 1 is followed, utilizing 4.62 g. (0.2 mole) of 1-benzylideneamino-5-methyl-5,6-dihydrouracil [J. Med. Pharm. Chem., 3, 353, (1961)].

Example 7.—1 - (1 - methyl-5-nitro-2-pyrrolylmethyleneamino)-3,6-dimethyl-5,6-dihydrouracil A solution of 1-benzylideneamino-6-methyl-5,6-dihydrouracil (11.6 g., 0.05 mole) in dilute aqueous sodium hydroxide (2.4 g., 0.06 mole in 50 ml. of water) is cooled (5–10°) and treated dropwise with dimethylsulfate (6.95 g., 0.055 mole) over a period of 25 minutes. After the addition is complete, the mixture is allowed to stir at room temperature for 40 minutes, then the precipitated solid is collected; washed with cold water and dried. Recrystallization from heptane containing a little ether gives colorless microcrystals, M.P. 89–91° of 1-benzylideneamino-3,6-dimethyl-5,6-dihydrouracil.

The procedure of Example 1 is then followed, using 4.34 g. (0.02 mole) of this 3,6-dimethyl compound.

Example 8.—1 - (5 - nitro - 2 - pyrrolylmethyleneamino) 6-methyl-5,6-dihydrouracil Benzaldehyde is distilled from a refluxing solution of 1 - benzylideneamino - 6 - methyl - 5,6 - dihydrouracil (4.62 g., 0.02 mole) in 1:1 hydrochloric acid (50 ml.), then water (50 ml.) is added, followed by a solution of 5-nitro-2-pyrrolecarboxaldehyde (2.8 g., 0.02 mole) in ethanol (50 ml.). After a few minutes, the yellow-orange precipitate which forms is collected to give 5.0 g. of crude yellow product, M.P. 220–225° dec. Recrystallization from acetic acid-ethanol gives yellow microcrystals, M.P. 225–226° dec.

Example 9

The following compounds are hydrolyzed and then treated with 2.8 g. (0.02 mole) of 5-nitro-2-pyrrolecarboxaldehyde according to the procedure of Example 8.

1-benzylideneamino-5,6-dihydrouracil (4.34 g.)
1-benzylideneamino-6-ethyl-5,6-dihydrouracil (4.9 g.)
1-benzylideneamino-6-propyl-5,6-dihydrouracil (5.2 g.)
1-benzylideneamino-6-butyl-5,6-dihydrouracil (5.47 g.)
1-benzylideneamino-5-methyl-5,6-dihydrouracil (4,62 g.)
1-benzylideneamino-3,6-dimethyl-5,6-dihydrouracil (4.34 g.)

The products obtained are, respectively:

1-(5-nitro-2-pyrrolylmethyleneamino)-5,6-dihydrouracil
1-(5-nitro-2-pyrrolylmethyleneamino)-6-ethyl-5,6-dihydrouracil
1-(5-nitro-2-pyrrolylmethyleneamino)-6-butyl-5,6-dihydrouracil
1-(5-nitro-2-pyrrolylmethyleneamino)-6-butyl-5,6-dihydrouracil
1-(5-nitro-2-pyrrolylmethyleneamino)-5-methyl-5,6-dihydrouracil
1-(5-nitro-2-pyrrolylmethyleneamino)-3,6-dimethyl-5,6-dihydrouracil

I claim:
1. A chemical compound of the structure:

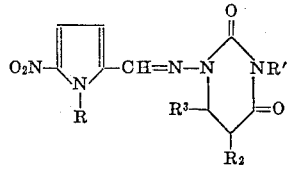

wherein R, $R^1$, $R^2$, and $R^3$ are selected from the group consisting of hydrogen and lower alkyl, with the proviso that R and $R^1$ are not both hydrogen.

2. A chemical compound of the structure:

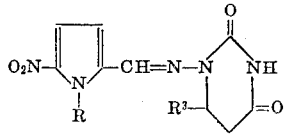

wherein R and $R^3$ are lower alkyl.

3. A chemical compound of the structure:

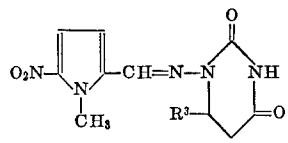

wherein R³ is lower alkyl.

4. 1 - (1 - methyl - 5 - nitro-2-pyrrolymethylene-amino)-6-methyl-5,6-dihydrouracil.

5. A compound as claimed in claim 1, in which R¹ is lower alkyl of 1 to 6 carbon atoms.

6. A compound as claimed in claim 5, in which R is lower alkyl of 1 to 6 carbon atoms.

7. A compound as claimed in claim 5, in which R³ is lower alkyl of 1 to 6 carbon atoms.

8. A compound as claimed in claim 7, in which R¹ and R³ are methyl, R is hydrogen or methyl, and R² is hydrogen.

References Cited

UNITED STATES PATENTS 3,001,992   9/1961   Bellamy et al. _____ 260—240

FOREIGN PATENTS 939,941   10/1963   Great Britain.
1,117,000   11/1961   Germany.

JAMES A. PATTEN, *Primary Examiner.*

H. I. MOATZ, *Assistant Examiner.*